United States Patent
Shimoda et al.

(10) Patent No.: US 10,209,103 B2
(45) Date of Patent: Feb. 19, 2019

(54) LINEAR ENCODER

(71) Applicant: DR. JOHANNES HEIDENHAIN GmbH, Traunreut (DE)

(72) Inventors: Daisuke Shimoda, Tokyo (JP); Katsumi Motoyuki, Tokyo (JP); Yoshio Watanabe, Tokyo (JP)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 116 days.

(21) Appl. No.: 15/396,831

(22) Filed: Jan. 3, 2017

(65) Prior Publication Data
US 2017/0199060 A1  Jul. 13, 2017

(30) Foreign Application Priority Data

Jan. 7, 2016  (JP) .................................. 2016-001437

(51) Int. Cl.
*G01D 5/347* (2006.01)
*G01D 11/10* (2006.01)

(52) U.S. Cl.
CPC ......... *G01D 5/34761* (2013.01); *G01D 11/10* (2013.01)

(58) Field of Classification Search
CPC ...... G01D 5/34; G01D 5/347; G01D 5/34707; G01D 5/26; G01D 5/34746; G01D 5/34753; G01D 5/34761; G01D 11/10
See application file for complete search history.

(56) References Cited

U.S. PATENT DOCUMENTS

| 3,769,467 | A |   | 10/1973 | Gabor |                        |
|-----------|---|---|---------|-------|------------------------|
| 4,167,742 | A | * | 9/1979  | Head  | G01D 15/18<br>347/44   |
| 4,982,508 | A | * | 1/1991  | Nelle | G01B 5/0014<br>33/702  |
| 5,174,671 | A | * | 12/1992 | Pawlak| B41J 1/24<br>101/93.48 |
| 5,485,680 | A | * | 1/1996  | Nelle | G01D 5/34769<br>33/705 |

(Continued)

FOREIGN PATENT DOCUMENTS

DE        2305708 A1      8/1973
DE   102008060839 A1      6/2010

(Continued)

*Primary Examiner* — John Lee
(74) *Attorney, Agent, or Firm* — Leydig, Voit & Mayer, Ltd.

(57) ABSTRACT

A linear encoder includes a scale disposed within a housing and a scanning unit that is displaceable in a measuring direction relative to the scale. The scanning unit includes a scanning head disposed inside of the housing opposite to the scale such that the scale is scannable by the scanning head, as well as a mount to which the scanning head is fastened, and a driving component, via which the mount is coupled to a mounting base disposed outside of the housing. A vibration damper suppresses vibrations transversely to the measuring direction. The vibration damper is disposed on the mount or on the scanning head, and includes a damping mass and an elastic element. The damping mass is fastened by the elastic element to an attachment surface of the mount or of the scanning head.

5 Claims, 3 Drawing Sheets

(56) References Cited

U.S. PATENT DOCUMENTS

| | | | | |
|---|---|---|---|---|
| 6,036,162 | A * | 3/2000 | Hayashi | F16F 15/00 248/550 |
| 6,349,481 | B1 * | 2/2002 | Nelle | G01D 5/34707 33/701 |
| 9,234,734 | B2 * | 1/2016 | Schmoller | G01B 5/02 |
| 9,395,215 | B2 | 7/2016 | Motoyuki | |
| 2002/0179806 | A1 * | 12/2002 | Teng | F16F 7/1005 248/618 |
| 2005/0046413 | A1 | 3/2005 | Schmidt et al. | |
| 2005/0080193 | A1 | 4/2005 | Wouters et al. | |
| 2005/0159228 | A1 * | 7/2005 | Otavsky | F16C 3/02 464/180 |
| 2009/0013552 | A1 * | 1/2009 | Affa | G01D 5/264 33/706 |
| 2011/0041602 | A1 * | 2/2011 | Jocham | G01C 19/00 73/504.12 |
| 2011/0209352 | A1 * | 9/2011 | Affa | G01D 5/34715 33/706 |
| 2013/0227852 | A1 * | 9/2013 | Schmoller | G01B 5/02 33/706 |
| 2013/0227853 | A1 * | 9/2013 | Schmoller | G01B 5/02 33/706 |
| 2014/0284464 | A1 * | 9/2014 | Motoyuki | G01D 5/34746 250/231.1 |
| 2015/0346232 | A1 * | 12/2015 | Pruksch | F16F 15/04 73/493 |
| 2016/0011017 | A1 * | 1/2016 | Hayashi | G01D 5/34753 33/707 |
| 2017/0199060 | A1 * | 7/2017 | Shimoda | G01D 5/34761 |

FOREIGN PATENT DOCUMENTS

| | | |
|---|---|---|
| EP | 1436633 A1 | 7/2004 |
| JP | H 07243869 A | 9/1995 |
| JP | 2006147989 A | 6/2006 |
| JP | 2007040873 A | 2/2007 |
| JP | 2014182054 A | 9/2014 |

* cited by examiner

LINEAR ENCODER

CROSS-REFERENCE TO PRIOR APPLICATION

Priority is claimed to Japanese Patent Application No. JP 2016-001437, filed on Jan. 7, 2016, the entire disclosure of which is hereby incorporated by reference herein.

FIELD

The present invention relates to a linear encoder that makes possible a precise position measuring and is suited for use on machine tools.

BACKGROUND

The basic design of a linear encoder is known, for example, from JP 2007-040873 A. The linear encoder is composed of a scale within a housing and of a scanning unit. The scanning unit includes a scanning head, which is disposed opposite the scale to allow scanning of the same and is displaceable relative thereto in the measuring direction, as well as a mount to which the scanning head is fastened inside of the housing. The scanning head itself is guided on the scale via guide elements. The mount is coupled via a driving component to a mounting base configured outside of the housing. Provided between the mount and the driving component is a compensating coupling that couples the scanning head to the driving component in the measuring direction rigidly and, in directions transversely thereto, flexibly.

This compensating coupling can cause errors during position measurement due to play, in particular in response to a change in direction.

For that reason, linear encoders have been developed that make do without such a coupling, where the scanning head is not guided on the scale. A linear encoder of this type is described in JP 2014-182054 A. Since no compensating coupling is provided between the mount and the scanning head, the position measuring cannot be negatively affected by any reversal error of a coupling.

JP 2006-147989 A describes a light exposure device that employs a vibration damper that is composed of an elastic element and a damping mass.

German Patent Application DE 10 2008 060 839 A1 describes a rotary encoder where a vibration damper is mounted externally on the fixed housing. The vibration damper is constituted of an elastic element upon which a damping mass is mounted.

SUMMARY

In an embodiment, the present invention provides a linear encoder having a scale disposed within a housing and a scanning unit that is displaceable in a measuring direction relative to the scale. The scanning unit includes a scanning head disposed inside of the housing opposite to the scale such that the scale is scannable by the scanning head, as well as a mount to which the scanning head is fastened, and a driving component, via which the mount is coupled to a mounting base disposed outside of the housing. A vibration damper suppresses vibrations transversely to the measuring direction. The vibration damper is disposed on the mount or on the scanning head, and includes a damping mass and an elastic element. The damping mass is fastened by the elastic element to an attachment surface of the mount or of the scanning head.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
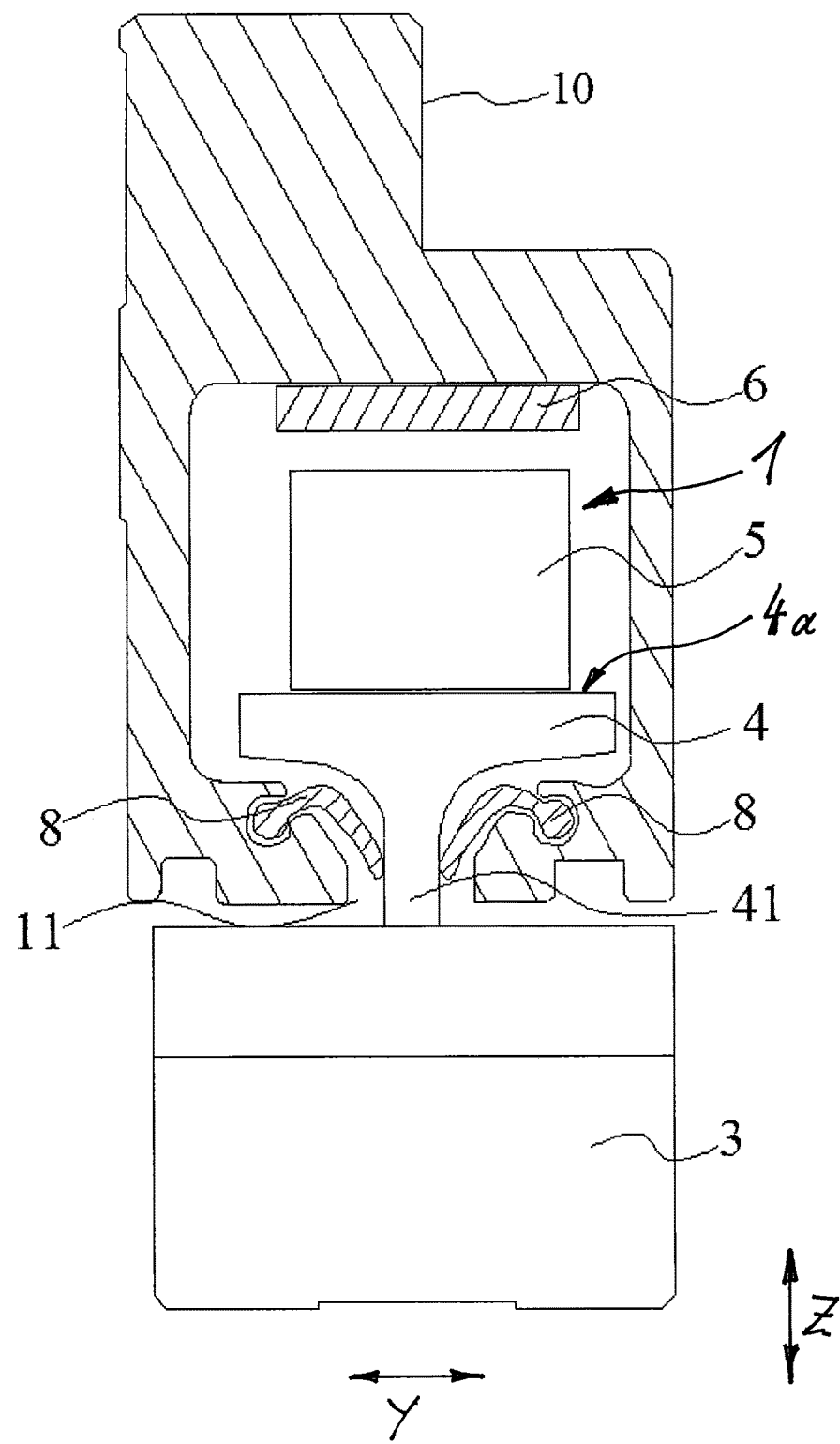
FIG. 1 shows a cross section of a linear encoder according to an embodiment of the present invention.

In an embodiment, the present invention provides a linear encoder that makes highly precise measurements possible.

In an embodiment, the present invention prevents measuring errors, and a stable measurement is possible.

The inventors of the present invention have found that mechanical vibrations emanating from the object to be measured are transmitted to the scanning head. The driving component amplifies the vibrations of the scanning head, and measuring errors occur as a result. Moreover, it was found that the driving component and the scanning head may even become damaged when resonance effects occur.

To prevent such a resonance effect, a design is also conceivable, where a compensating coupling is inserted between the scanning head and the measurement object, as provided by JP 2007-040873 A, so that the vibrations are not transmitted. However, as described above, this degrades measuring accuracy. For that reason, the inventors of the present invention have tested various methods for suppressing the vibrations of the scanning head and found that it is particularly effective to place a dynamic vibration damper on the scanning head or in the vicinity thereof.

The linear encoder according to an embodiment of the present invention prevents irregularly occurring measurement errors and makes stable measurements possible, especially in the context of highly precise measurements. Moreover, even in the preliminary stages, it is possible to prevent performance characteristics that induce disturbances in the assembly elements that constitute the linear encoder.

Accordingly, an embodiment of the present invention includes a linear encoder having a scale inside of a housing, as well as a scanning unit that is displaceable relative to the scale in the measuring direction and that has the following components:

a scanning head that is configured inside of the housing opposite the scale in order to scan the same;

a mount that is fastened to the scanning head;

a driving component, via which the mount is coupled to a mounting base configured outside of the housing.

A vibration damper, which suppresses vibrations transversely to the measuring direction, is configured in accordance with an embodiment of the present invention on the mount or on the scanning head, the vibration damper being composed of a damping mass and of an elastic element, and the damping mass being fastened by the elastic element to an attachment surface of the mount or of the scanning head.

The vibration damper is preferably accommodated within the housing, where it is protected.

As the scanning head is not guided on the scale and, therefore, does not have any contact therewith (contactless), the connection between the scanning head and the mounting base may be designed without any compensating coupling and, thus, to be relatively rigid in all directions, thereby enhancing the measuring accuracy.

For this, in particular, the driving component is designed to be sword-shaped and flexurally stiff in the measuring direction. In a second direction that is orthogonal to the measuring direction, the driving component is designed to be relatively thin, since, in this region, it must be passed through the opening of the housing and the lip seal. This driving component region that is designed to be relatively thin in cross section causes a susceptibility to transversal vibrations that are to be damped by the present invention. The elastic element is, therefore, advantageously configured and designed to allow the damping mass to move in the second direction. In such situations, the attachment surface is a plane that is defined by the measuring direction and the second direction.

An especially advantageous design is obtained when the elastic element is an adhesive layer between the mount and the damping mass.

The adhesive may be acrylic-based and be affixed to the attachment surface by its own adhesive strength.

A compact design may be achieved by configuring the vibration damper at a location on the mount that is longitudinally aligned with the scanning head in the measuring direction.

Providing the dynamic vibration damper at least in the vicinity of the scanning head in this manner suppresses a resonance effect of the scanning unit, which includes the scanning head, and thereby makes it possible to prevent an erroneous operation and damages caused by excessive vibrations.

With regard to the above point, a plurality of other possible approaches are conceivable as countermeasures:

(1) Absorbing the vibrations by inserting an elastic element between the scanning head and the driving component. However, as already mentioned, it is not advisable to configure an elastic element between the scanning head and the driving component when performing highly precise measurements.

(2) To increase the rigidity of the driving component, a thick variant is also conceivable. To perform highly precise, high-speed and high-acceleration measurements, a lowest possible sliding resistance of the driving component is desired. Moreover, it is difficult to fashion the driving component with a cross section large enough to ensure rigidity.

(3) A lightweight variant of the scanning head is also conceivable. However, highly precise measurements often require a scanning head having integrated signal processing and monitoring. Standardized components also often lead to the use of existing scanning heads that are already being used for other linear encoders.

(4) Also possible is a mechanical shift of the resonance point of the vibrations, which are transmitted from the measurement object. However, the vibrational frequency produced by the resonance effect differs as a function of the existing measuring object and of the type of linear encoder, so that a specific adaptation is not practical.

An effective measure for actively preventing vibration is the use a dynamic vibration damper. In the present invention, the dynamic vibration damper is formed by combining a damping mass and an elastic element.

An inorganic material, such as a metal having a comparatively high density, for instance, glass, ceramic or the like may be used as a damping mass. Preferred, in particular, is a metal, such as iron, stainless steel, copper, brass, lead, tin, tungsten, molybdenum or the like, or an alloy for which two or more of the mentioned metals are used. The advantage of a metal is that the processing is easy, and it is simple to adjust the mass. There are basically no limitations for the mass of the damping mass. It suffices to adjust it to the ideal mass by adapting it to the resonance properties to be suppressed, respectively attenuated. An adjustment to a range of 1 to 100 g and preferably of 8 to 80 g suffices for customary scanning heads. Even when attenuation properties are sacrificed to a certain extent, the size thereof must allow it to be accommodated in the housing. The form is also not limited; however, a general block form, such as a hexahedron, is preferred. Also favorable is the variant of a form that makes it possible to ensure a bonding surface with the elastic element within a range of from $\frac{1}{10}$ to $\frac{1}{6}$ of the entire surface. To facilitate the vibrational movement of the damping mass, deliberately small bonding surface dimensions may be configured, or, for example, a stepped portion may be formed in the side surface, thereby realizing a small outer periphery for the damping mass's side region near the bonding surface.

The elastic element, which, together with the damping mass, forms the dynamic vibration damper, is also referred to as an adhesive elastic element. Although there are essentially no limitations, a material based on natural or synthetic elastomer is preferred. An adhesive element function is also imparted thereto, allowing it to act as an adhesive itself, and thereby fix the damping mass in position. Natural rubber-based adhesives, where a tackifier had been added to a natural rubber; specifically, silicon-based adhesives, urethane-based adhesives, acrylic-based adhesives, and the like may be cited; preference being given to acrylic-based adhesives that have excellent weathering resistance, thermal resistance, solvent resistance and the like, that may be used to readily obtain the required damping properties. Since natural rubber-based adhesives have unsaturated bonds between the molecules, they readily degrade in the presence of oxygen or light. Silicon-based adhesives do, in fact, feature excellent thermal resistance, chemical resistance and weathering resistant low-temperature properties, but the adhesive strength thereof is not high, and they are expensive. Urethane-based adhesives also have the problem of a weak adhesion.

In the case of acrylic-based adhesives, an acrylic polymer, to which the required adhesive function is imparted, is synthesized by a copolymerization of acrylic monomers. Upon synthesis of the adhesive, the acrylic monomers are to be selected, taking into account the adhesion of the synthesized acrylic polymer, the glass transition temperature (Tg), which influences the application temperature and the like, the introduction of a cross-linking point, which influences stability, thermal resistance and the like, and the copolymerizability of the acrylic monomers, which influences the uniformity of the acrylic polymer and of the cross-linking point.

For the main monomers, ethyl acrylate, butylacetate, 2-ethylhexyl acrylate, isononyl acrylate and the like may be cited as specific acrylic monomers; and, for the comonomers, vinyl acetate, acrylonitrile, acrylamide, styrene, methyl methacrylate, methyl acrylate and the like are cited as monomers that are used to increase cohesion force; and, as monomers having functional groups, acrylic acid, hydroxyethyl acrylate, acrylamide, glycidyl methacrylate and the like are cited for introducing a cross-linking point. The most ideal material is to be selected from among these materials. However, besides the monomers cited above and depending on the need, suitable monomers may also be used and additives added that impart or supplement various further functions.

As far as the elastic element is concerned, a thickness suffices that does not adversely affect the vibrational movement required for the damping, the angular displacement, respectively movement of the damping mass and, moreover, makes it possible to absorb vibrations. An adjustment to the ideal thickness should follow. Depending on the material and the hardness and the like, there are, in fact, differences, but the thickness is preferably within a range of from 0.05 to 5 mm, and, even better, within a range of from 0.1 to 2 mm in the case of an acrylic-based material, for example. The elastic element should have a degree of adhesiveness that makes possible a strong enough fixing to the bonding surface of the object, upon which the fixing in position takes place. The adhesiveness should be provided to an extent that does not adversely affect the desired elasticity. Specifically, at a room temperature in a 180 degree adhesion test (ASTM D3330 peel adhesion), at least 10 N/10 mm is preferred and, in particular, at least 12 N/10 mm is advantageous. The adhesive layer of a commercial adhesive tape may also be used for the elastic element, for example.

The dynamic vibration damper is formed in such a way that the damping mass and the elastic element are disposed one upon another in relation to the object on which the fixing in position takes place. The array is formed in a way that allows the elastic element to be inserted between the object upon which the fastening is carried out, and the damping mass, and both to be bonded and fixed in position.

The vibrations damped by the dynamic vibration damper of the present invention are vibrations in the transverse direction relative to the operating direction (measuring direction) of the scanning head, and vibrations in the parallel direction relative to the plane of the scale. It is the point of connection between the driving component and the mount that becomes the point of rotation of the mount; and it is assumed that the mount vibrates with this region as the center. Therefore, it is certainly not a complete transverse fluctuation, but a rolling that accompanies a rotation relative to the movement axis (measuring direction X). The vibration control effect obtained by the dynamic vibration damper does, in fact, vary depending on the materials and masses used for the damping mass and the elastic element. However, in one trial, the vibrations were able to be suppressed by the acceleration (m/s$^2$) to preferably ⅙ and, even better, to 1/10.

Figure 2:
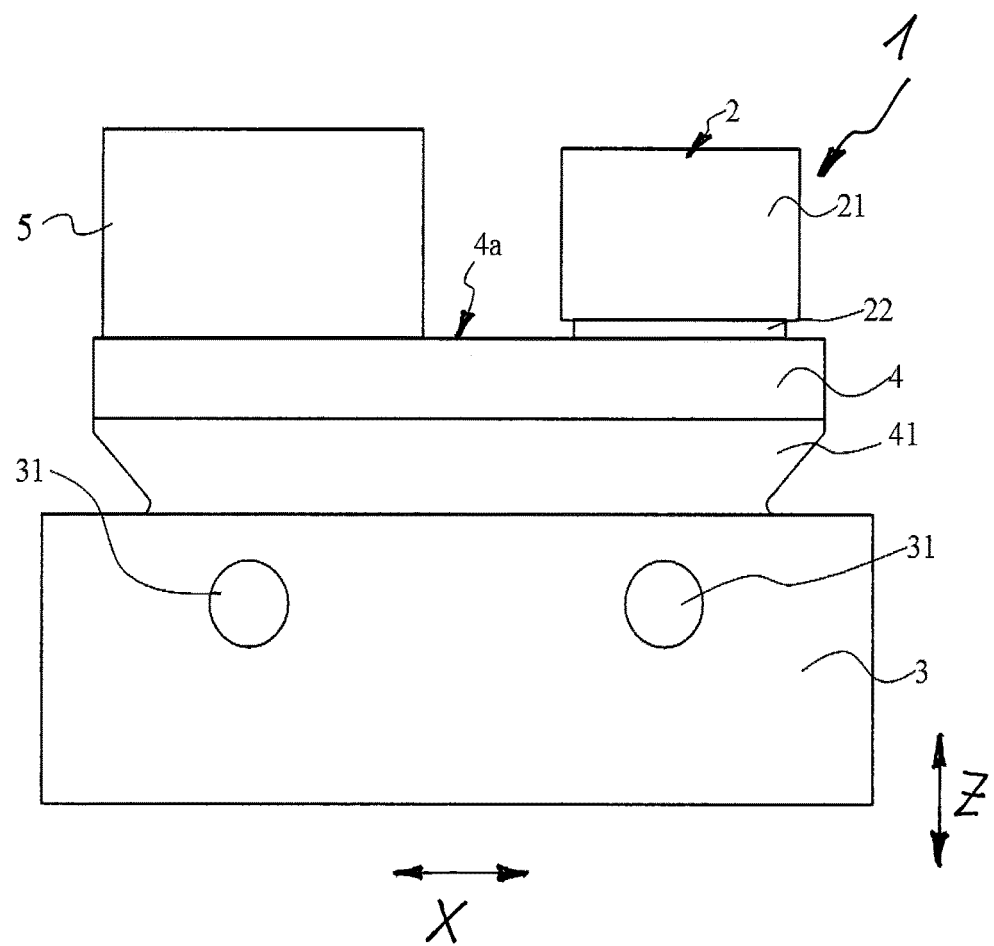
FIG. 2 shows a side view of the scanning unit of the linear encoder according to FIG. 1.

As far as the fixing point of the dynamic vibration damper is concerned, it must be as close as possible to the scanning head, which represents the main system and, moreover, at a highest possible location relative to the positional orientation shown in FIG. 2. For that reason, a direct fixing in position on the scanning head is, in fact, conceivable. However, it should be fixed in position at a location that is separate from the scanning head to ensure that there is no danger whatsoever of disadvantageously influencing the scanning head, and, from the point of view of maintenance. Specifically, it is a question of a location that is longitudinally aligned in the moving direction of the scanning head. Also, it should be located in the free space on the mount. A location of this type makes an accommodation in the housing readily possible. This means, it is desirable for it to be accommodated on the upper surface of the mount or on a structure that is disposed on the mount, or on the upper surface of a housing that covers these elements.

Likewise possible is that the vibration damper be directly accommodated on the scanning head. In such a case, however, consideration must be given with regard to preventing a fall, and a safety mechanism must be provided in the case of a fall. For example, the scanning head includes a light-emitting element and a light-receiving element and converts a pattern formed on the scale into electrical signals. There is the transmission type where the light-emitting element and the light-receiving element are disposed opposite one another across the scale, and the reflection type, where it is disposed on only one side. The present invention may be used for both types. However, a magnet or an induction type is also possible. It is easy to derive the exact structure of these detection units from the generally known literature.

The linear encoder has a scanning unit 1 which, for purposes of position measurement, is displaceable in measuring direction X relative to a scale 6 accommodated in a housing 10. For purposes of position measurement, housing 10, together with scale 6 accommodated therein, is fastened to a first machine part, and scanning unit 1 to a second machine part whose position is to be measured relative to the first machine part.

To clarify the spatial positional relationship of the parts of the linear encoder, the terms "bottom" and "top" are used in the following. These terms refer to the linear encoder position illustrated in FIGS. 1 and 2.

Scanning unit 1 is composed of a scanning head 5 that scans scale 6 without any contact in order to produce position-dependent measurement signals. Scanning head 5 is fastened to a surface 4a of mount 4. Mount 4, in turn, is fastened via a sword-shaped driving component 41 to a mounting base 3. In order to secure scanning unit 1, mounting base 3 is configured on the second machine part to be measured. For this purpose, it has a plurality of holes 31 through which the fastening screws may be passed.

On and parallel to the top side thereof, scale 6 is fixed in position inside of housing 10 by an adhesive. This adhesive has elasticity, whereby various expansions and contractions between housing 10 and scale 6 induced by temperature changes may be absorbed.

Scale 6 is made of a glass material, for example. A pattern, also referred to as a measuring graduation, is applied to the side of scale 6 opposite the bonding surface. This pattern is formed, for example, by the vapor deposition of a metal material, such as chromium, and a patterning or an etching in a subsequent process. Scale 6 may also be made of a metal material. However, from the standpoint of a negligible thermal influence, the capability for high precision execution, ease of pattern formation and the like, a glass-based material is superior.

Scanning head 5 is disposed below scale 6 with a constant gap. This scanning head 5 includes an optical sensor for reading the pattern that is formed on scale 6, as well as a light source and electronic circuits for processing the recorded positionally dependent electrical signals output by the sensor. To prevent an erroneous operation and to maintain constant accuracy, it is extremely important to maintain a constant distance between the bottom side of scale 6 and the top side of scanning head 5, i.e., the gap, to ensure stabilization of the read signals output by scanning head 5.

Scanning head 5 is located on a mount 4, which constitutes the fastening base, and is held in position thereon by screws, for example. Extending in the bottom region of mount 4 is a driving component 41 that becomes thinner in the direction of movement, thus in the X direction, in a sword shape, respectively knife shape, toward the bottom in the direction of mounting base 3. Driving component 41 is coupled in one piece to mounting base 3.

Configured in the bottom region of housing 10 is a slotted opening 11 to allow driving component 41 to be passed through. To prevent the ingress of dust into the interior of housing 10, lip seals 8 for sealing are configured on both sides in opening 11. They close in the middle region of opening 11 at locations where driving component 41 is not situated, thereby enhancing the seal tightness of the housing interior. To minimize the sliding resistance to these lip seals 8 and execute high precision measurements, driving component 41 is to be formed as thin as possible in this passage region (viewed in the Y direction).

An embodiment of the present invention provides that a vibration damper 2 be located on mount 4. Vibration damper 2 is advantageously configured in accordance with FIG. 2; i.e., it is longitudinally aligned with scanning head 5 in measuring direction X. This vibration damper 2 is composed of a damping mass 21 and an elastic element 22 between damping mass 21 and mount 4. Elastic element 22 is, in particular, an adhesive elastic element 22 that is bonded to top surface 4a of mount 4, thereby fastening damping mass 21 thereto. In this example, this adhesive elastic element 22 is an acrylic-based adhesive to which vibration damper element 21 made of iron is fastened. Since vibration damper 2 is located together with scanning head 5 on mount 4, it is able to effectively suppress the resonance effect of scanning unit 1. It is particularly effective for suppressing a transverse displacement relative to measuring direction X. Since damping mass 21 is placed on mount 4 and fixed thereto only via adhesive elastic element 22, the mounting is also simple and may also be undertaken with little effort on already existing linear encoders.

To verify the advantageous effect of the present invention, a linear encoder in accordance with an embodiment of the present invention was constructed, and trials were performed (test piece of the present invention). A square, block-shaped stainless steel body was used for damping mass 2; while an acrylic-based adhesive tape having a thickness within a range of from 0.1 to 1 mm was used for adhesive, elastic element 22. The linear encoder provided with vibration damper 2 was placed on a vibratory device and fastened in place thereto. An acceleration sensor for detecting vibration was mounted on scanning head 5; and vibrations within a range of 50 to 200 m/s$^2$ as typical for linear encoder use were introduced to mounting base 3. The resonance effect was measured while the vibration period was subjected to variations within a frequency range of from 55 to 2000 Hz.

As a comparison, a linear encoder was constructed without vibration damper 2, but otherwise having the same design, and the same measurements were performed (comparison test piece).

Figure 3:
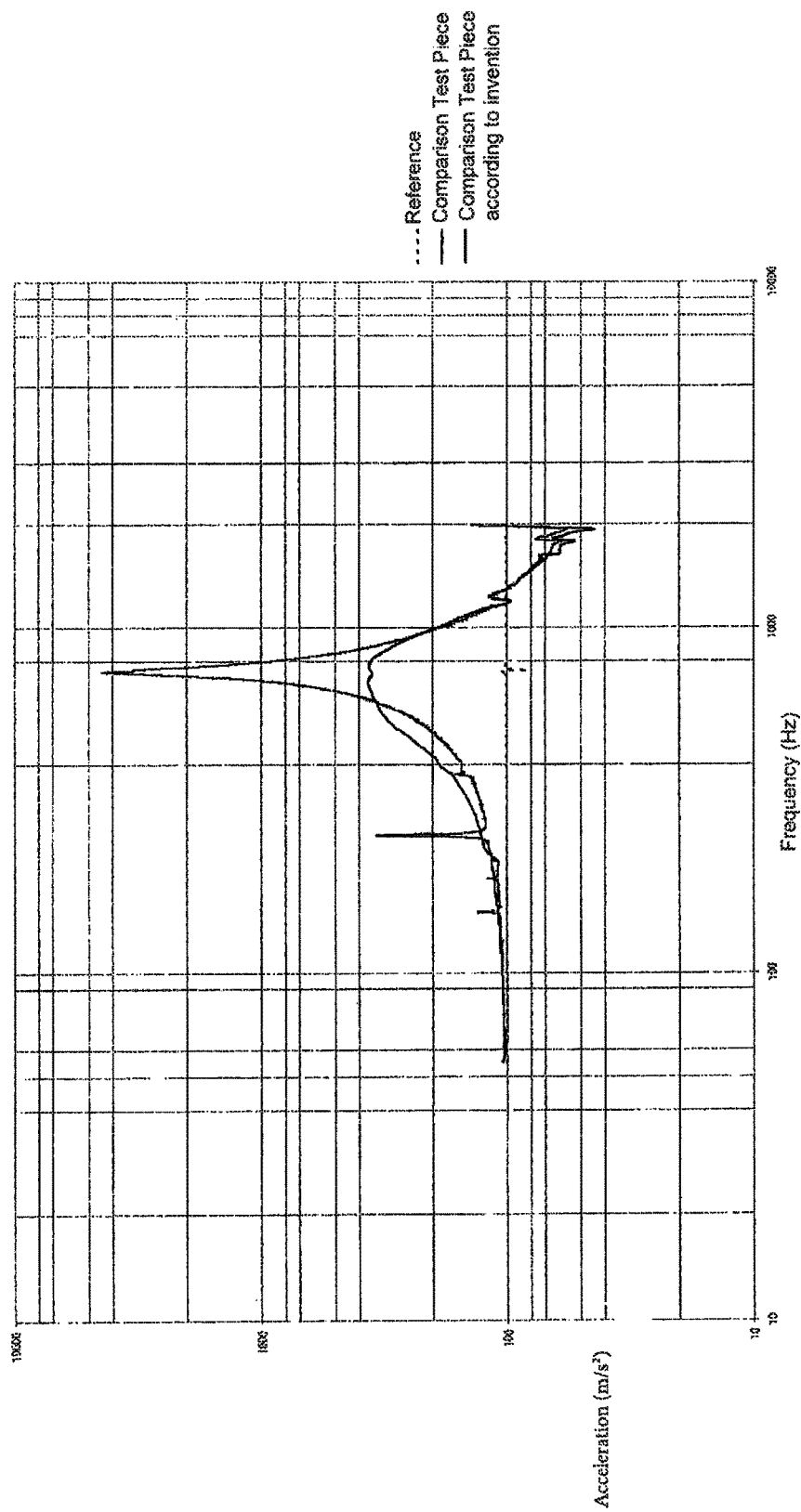
FIG. 3 shows a diagram illustrating the vibrational acceleration of the scanning unit as a function of the excitation frequency in the case of an excitation trial.

The results of the measurements are shown in FIG. 3. In FIG. 3, the acceleration performed by vibratory device is indicated as "reference;" and the accelerations measured on scanning head 5 are plotted in relation to this vibration as "test piece of the present invention," respectively "comparison test piece."

As is discernible from FIG. 3, the peak intensity at the resonance point in the case of the test piece of the present invention—thus including vibration damper 2—drops to 1/10, compared to comparison test piece.

The above, exemplarily illustrated configuration of vibration damper 2, which is aligned with scanning head 5 in measuring direction X, permits an especially space-saving design in the interior of housing 10. If enough space is available in housing 10, vibration damper 2 may then be alternatively configured in the Y direction as well, next to scanning head 5 or, alternatively, on scanning head 5.

The exemplarily described linear encoder functions in accordance with the optical scanning principle. However, the present invention is not limited thereto. Rather, other contactless scanning principles, such as magnetic or inductive scanning principles, are also possible.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A linear encoder, comprising:
a scale disposed within a housing;
a scanning unit that is displaceable in a measuring direction relative to the scale, the scanning unit comprising:
a scanning head disposed inside of the housing opposite to the scale such that the scale is scannable by the scanning head,
a mount to which the scanning head is fastened, and
a driving component, via which the mount is coupled to a mounting base disposed outside of the housing, wherein the driving component, in the measuring direction, is flexurally stiff, and, in a second direction that is orthogonal to the measuring direction, is relatively thin; and
a vibration damper including a damping mass and an elastic element, the damping mass being fastened by the elastic element to an attachment surface of the mount which is a plane that is defined by the measuring direction and the second direction, wherein the elastic element is an adhesive layer between the mount and the damping mass and is configured to allow the damping mass to move in the second direction so as to suppress vibrations transversely to the measurement direction.

2. The linear encoder as recited in claim 1, wherein the vibration damper is disposed inside of the housing.

3. The linear encoder as recited in claim 1, wherein the scanning head does not contact the scale and is fastened to the attachment surface of the mount without any compensating coupling.

4. The linear encoder as recited in claim 1, wherein the adhesive is acrylic-based and affixed by its own adhesive strength to the attachment surface.

5. The linear encoder as recited in claim 1, wherein the vibration damper is disposed at a location on the mount that is longitudinally aligned with the scanning head in the measuring direction.

\* \* \* \* \*